(12) United States Patent
Hirayama et al.

(10) Patent No.: US 12,208,360 B2
(45) Date of Patent: Jan. 28, 2025

(54) TREATED WATER DRYING DEVICE AND BOILER SYSTEM INCLUDING THE SAME

(71) Applicant: Mitsubishi Power, Ltd., Yokohama (JP)

(72) Inventors: Koichiro Hirayama, Tokyo (JP); Satoru Sugita, Yokohama (JP); Seiji Kagawa, Yokohama (JP); Toshihiro Fukuda, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 951 days.

(21) Appl. No.: 16/981,003

(22) PCT Filed: Mar. 18, 2019

(86) PCT No.: PCT/JP2019/011280
§ 371 (c)(1),
(2) Date: Sep. 15, 2020

(87) PCT Pub. No.: WO2019/188524
PCT Pub. Date: Oct. 3, 2019

(65) Prior Publication Data
US 2021/0016223 A1    Jan. 21, 2021

(30) Foreign Application Priority Data
Mar. 28, 2018  (JP) .................................. 2018-061568

(51) Int. Cl.
*B01D 53/73*    (2006.01)
*B01D 53/50*    (2006.01)
(Continued)

(52) U.S. Cl.
CPC ........... *B01D 53/73* (2013.01); *B01D 53/504* (2013.01); *B01D 53/80* (2013.01); *C02F 1/048* (2013.01);
(Continued)

(58) Field of Classification Search
CPC ...... B01D 53/504; B01D 53/73; B01D 53/80; B01D 2251/404; B01D 2251/606;
(Continued)

(56) References Cited

U.S. PATENT DOCUMENTS 4,519,990 A * 5/1985 Bevilaqua ................ B01D 1/18
95/290
4,579,069 A * 4/1986 Gay .......................... G21F 9/32
159/48.1
(Continued)

FOREIGN PATENT DOCUMENTS

CN           1765470 A       5/2006
CN         105903217 A       8/2016
(Continued)

OTHER PUBLICATIONS

Partial translation of WO 2013021470 A1 (Year: 2013).*
(Continued)

*Primary Examiner* — Charles S Bushey
(74) *Attorney, Agent, or Firm* — WHDA, LLP

(57) ABSTRACT

A treated water drying device 20 for vaporizing treated water by heat of a combustion gas, the device 20 including a housing 21, a combustion gas supply port 26 for supplying the combustion gas to the housing 21, a water supply portion 27 for vaporizing the treated water by bringing the treated water into contact with the combustion gas supplied to the housing 21, and an exhaust port 28 for discharging a water-containing gas including the vaporized treated water to an outside of the housing 21. The exhaust port 28 is disposed at a lowermost part of the housing 21 and opens in a direction crossing a vertical direction. The housing 21 has a bottom 22 including an inclined portion 23 formed toward the exhaust port 28.

7 Claims, 12 Drawing Sheets

(51) Int. Cl.
*B01D 53/80* (2006.01)
*C02F 1/04* (2023.01)
*C02F 101/10* (2006.01)
*C02F 103/18* (2006.01)

(52) U.S. Cl.
CPC .. *B01D 2251/404* (2013.01); *B01D 2251/606* (2013.01); *B01D 2257/302* (2013.01); *C02F 2101/101* (2013.01); *C02F 2103/18* (2013.01)

(58) Field of Classification Search
CPC ............... B01D 2257/302; C02F 1/048; C02F 2101/101; C02F 2103/18
See application file for complete search history.

(56) References Cited

U.S. PATENT DOCUMENTS

| | | | | |
|---|---|---|---|---|
| 4,857,276 | A * | 8/1989 | Seto | B01D 53/8625 55/440 |
| 6,946,011 | B2 * | 9/2005 | Snyder | B01F 25/4316 366/337 |
| 7,556,674 | B2 * | 7/2009 | Andersson | B01D 45/08 55/319 |
| 2006/0060088 | A1 | 3/2006 | Maryamchik et al. | |
| 2012/0240761 | A1 | 9/2012 | Ukai et al. | |
| 2014/0045131 | A1 | 2/2014 | Fukuda et al. | |
| 2014/0083629 | A1 | 3/2014 | Fukuda et al. | |
| 2015/0308744 | A1 | 10/2015 | Fukuda et al. | |
| 2017/0038066 | A1 * | 2/2017 | Oda | F23J 15/022 |

FOREIGN PATENT DOCUMENTS

| | | |
|---|---|---|
| JP | H10-165734 A | 6/1998 |
| JP | 2003-112080 A | 4/2003 |
| JP | 2012-76070 A | 4/2012 |
| JP | 2012-196638 A | 10/2012 |
| JP | 2012-200721 A | 10/2012 |
| JP | 2012-250140 A | 12/2012 |
| JP | 2012-250141 A | 12/2012 |
| JP | 2013-104641 A | 5/2013 |
| JP | 2014/084081 A1 | 6/2014 |
| WO | WO 2013/021470 A1 * | 2/2013 |

OTHER PUBLICATIONS

Office Action dated Jun. 28, 2022, issued in counterpart CN application No. 201980021472.6, with English translation. (11 pages).
Rain et al., "Mine Dust Control", Beijing: Coal Industry Press, 2017, pp. 117-118, cited in CN Office Action dated Jun. 28, 2022. (4 pages).
Office Action dated Feb. 14, 2022, issued in counterpart CN application No. 201980021472.6. (7 pages).
International Search Report dated Jun. 11, 2019, issued in counterpart International Application No. PCT/JP2019/011280. (2 pages).
International Preliminary Report on Patentability (Form PCT/IPEA/409) dated Oct. 8, 2020, of International Application No. PCT/JP2019/011280 , with English Translation. (17 pages).
Office Action dated Jan. 4, 2022, issued in counterpart JP Application No. 2018-061568, with machine translation. (8 pages).

* cited by examiner

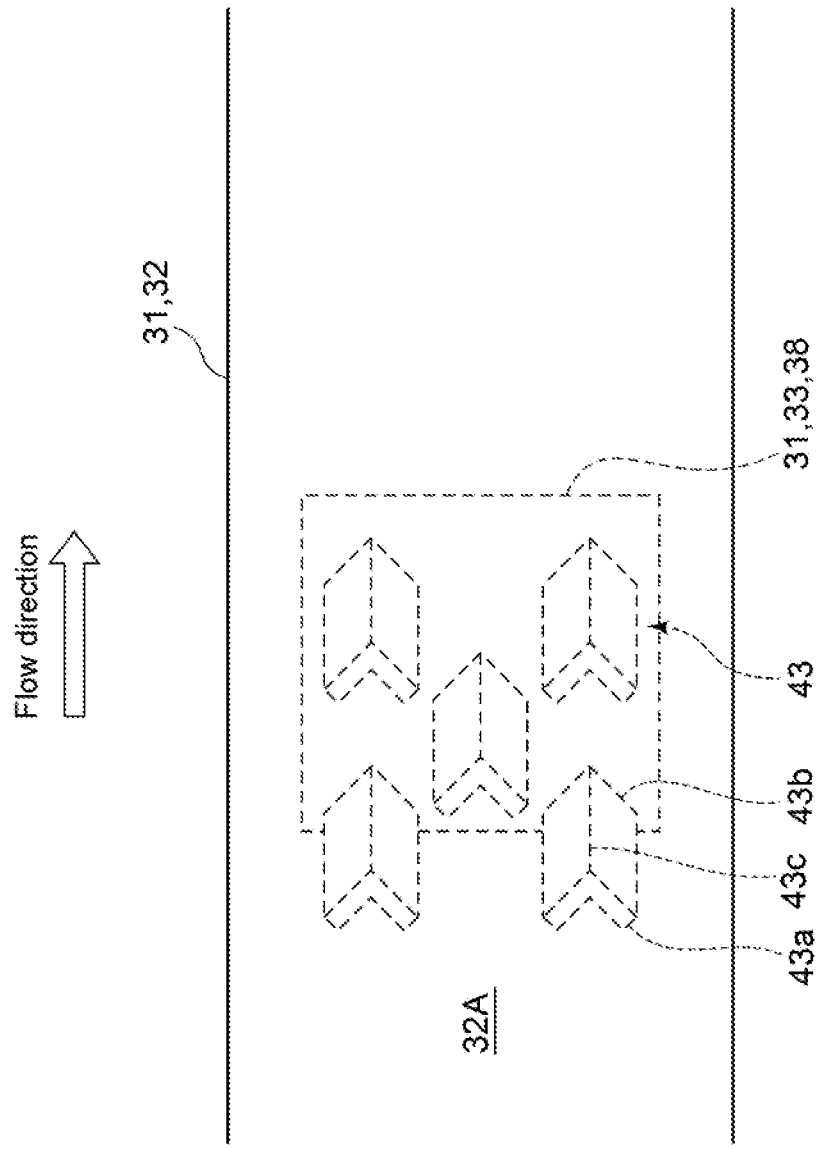

TREATED WATER DRYING DEVICE AND BOILER SYSTEM INCLUDING THE SAME

TECHNICAL FIELD

The present invention relates to a treated water drying device and a boiler system including the same.

BACKGROUND

A boiler is installed in a thermal power plant or the like, and a combustion gas generated by combusting fuel in the boiler is discharged from the boiler. Since the combustion gas contains sulfur oxides, a desulfurization device is used to remove the sulfur oxides in the combustion gas. The desulfurization device includes, for example, a wet desulfurization device using limewater. In the wet desulfurization device using limewater, the limewater serving as an absorption liquid and the combustion gas containing the sulfur oxides are brought into contact with each other. Then, with the contact, the sulfur oxides are absorbed by the limewater, and a sulfur content derived from the sulfur oxides is recovered and removed as gypsum.

Wastewater after the gypsum is recovered and removed (the absorption liquid that has contacted the combustion gas in the desulfurization device) can contain chloride ions, heavy-metal ions, and the like. Thus, in order to discharge the wastewater to the outside, the concentration of each component in the wastewater is preferably decreased to less than, or equal to, an effluent standard value. However, since removal of the respective components is expensive, an attempt to circulate the wastewater in the system without discharging the wastewater to the outside has been made.

Patent Document 1 describes that a combustion gas (high-temperature exhaust gas) is supplied to a drying device of a shape narrowing downward, and the supplied combustion gas is brought into contact with wastewater, thereby vaporizing the wastewater (see FIGS. 5 to 2, in particular). Moreover, Patent Document 1 describes that solids are accumulated in a narrow portion, and the solids are extracted from the bottom of the drying device (see [0052], in particular).

CITATION LIST

Patent Literature

Patent Document 1: JP2012-196638A

SUMMARY

Technical Problem

In the drying device described in Patent Document 1, a relatively light component (or a small component, for example, powder of combustion ash or the like) of the solids included in the combustion gas is discharged to the outside via an exhaust port by an air flow. However, the drying device may include a relatively heavy component (or a large component, for example, a lump of the combustion ash, a remaining component after drying of the wastewater, or the like) of the solids. Then, such a relatively heavy component of the solids is likely to be accumulated in the lower part of the drying device. In particular, if an air flow directed downward from above is generated, as in the drying device described in Patent Document 1, the solids are likely to be accumulated at the bottom where the downward air flow collides.

If the solids are accumulated at the bottom of the drying device, it is preferable that the accumulated solids are periodically discharged from the bottom of the drying device. However, the discharge work is troublesome, and thus a technique capable of suppressing the accumulation of the solids itself is desired.

An object of at least one embodiment of the present invention is to provide a treated water drying device capable of suppressing accumulation of solids at the bottom of the drying device and a boiler system including the same.

Solution to Problem (1) A desulfurization wastewater treatment device according to at least one embodiment of the present invention is a treated water drying device for vaporizing treated water by heat of a combustion gas, the device including a housing, a combustion gas supply port for supplying the combustion gas to the housing, a treated water supply portion for supplying the treated water into the housing, and an exhaust port for discharging a water-containing gas including the treated water that has been supplied to the housing and vaporized to an outside of the housing. The exhaust port is disposed at a lowermost part of the housing and opens in a direction crossing a vertical direction. The housing has a bottom at least partially including an inclined portion formed toward the exhaust port.

With the above configuration (1), since the bottom at least partially includes the inclined portion formed toward the exhaust port, it is possible to make solids included in the combustion gas be less accumulated at the bottom of the housing. Moreover, since the exhaust port is formed to open in the direction crossing the vertical direction, it is possible to suppress the height of the drying device.

(2) In some embodiments, in the above configuration (1), the inclined portion is formed at an angle which is not less than a repose angle of solids included in the combustion gas.

With the above configuration (2), since the inclined portion is formed at the angle which is not less than the repose angle of the solids, it is possible to easily suppress the accumulation of the solids at the bottom.

(3) In some embodiments, in the above configuration (1) or (2), the inclined portion is formed at an angle of not less than 30° and less than 90° with respect to a horizontal direction.

With the above configuration (3), it is possible to generally set the angle of the inclined portion to not less than the repose angle of the solids, and to easily suppress the accumulation of the solids.

(4) In some embodiments, in any one of the above configuration (1) to (3), the inclined portion includes a planar portion.

With the above configuration (4), it is possible to form the inclined portion of the bottom by the planar portion. Thus, it is possible to simplify the work of forming the bottom formed by the inclined portion, when manufacturing the drying device.

(5) In some embodiments, in any one of the above configurations (1) to (4), the treated water drying device includes an exhaust duct connected to the exhaust port. The exhaust duct includes an exhaust duct body portion giving passage to the water-containing gas discharged from the exhaust port, and a solid collection portion defining a collection space communicating with an opening formed in a lower part of the exhaust duct body portion, the collection space being provided to collect solids included in the water-containing gas passing through the exhaust duct body portion.

With the above configuration (5), it is possible to collect the solids in the solid collection portion under their own weights, and to suppress the inflow of the solids to the subsequent device. Thus, it is possible to avoid an unintended operational problem such as clogging of the subsequent device with the solids. Moreover, since the exhaust duct is provided with the solid collection portion, it is possible to easily extract the solids collected in the solid collection portion. Furthermore, since the water-containing gas is discharged through the exhaust port formed in the direction crossing the vertical direction, it is possible to easily cause the solids included in the water-containing gas to fall under their own weights, and to easily collect the solids in the solid collection portion.

(6) In some embodiments, in the above configuration (5), the housing includes a first protruding member protruding from an upper end of the exhaust port into the housing.

With the above configuration (6), it is possible to suppress a gas flow in the vicinity of the upper end at a connection position between the exhaust port and the exhaust duct body portion, and to suppress reach of the combustion gas, which flows in through the combustion gas supply port, to the exhaust port in the shortest distance. Thus, it is possible to suppress the passage of the solids above the exhaust port through the solid collection portion. As a result, it is possible to more reliably collect the solids in the solid collection portion formed in a lower part of the exhaust duct.

(7) In some embodiments, in the above configuration (5) or (6), the solid collection portion includes an opening/closing member for opening/closing the opening.

With the above configuration (7), it is possible to extract the solids collected in the solid collection portion, with the opening being closed. Thus, it is possible to suppress scattering of the solids to the exhaust port and the exhaust duct body portion (may be one of them), when the solids are extracted from the solid collection portion.

(8) In some embodiments, the exhaust duct body portion includes a second protruding member protruding from an upper inner surface of the solid collection portion toward the opening.

With the above configuration (8), it is possible to promote falling of the solids, which are included in the water-containing gas and easily fall under their own weights. Thus, it is possible to easily collect the solids in the solid collection portion.

(9) A boiler system according to at least one embodiment of the present invention is a boiler system including a boiler, a desulfurization device for desulfurizing an exhaust gas discharged from the boiler by bringing the exhaust gas into contact with an absorption liquid, and the treated water drying device according to any one of the above configurations (1) to (8). The combustion gas includes the exhaust gas discharged from the boiler. The treated water includes the absorption liquid that has contacted the exhaust gas and discharged from the desulfurization device.

With the above configuration (9), it is possible to vaporize the absorption liquid (the above-described wastewater) that has contacted the exhaust gas in the desulfurization device, as the treated water, in the drying device. Thus, it is possible to suppress discharge of the absorption liquid that has contacted the exhaust gas to the outside, and to reduce the cost of treating the wastewater. Moreover, it is also possible to suppress accumulation of the solids in the exhaust gas, in the drying device.

Advantageous Effects

According to at least one embodiment of the present invention, it is possible to provide a treated water drying device capable of suppressing accumulation of solids at the bottom of the drying device and a boiler system including the same.

BRIEF DESCRIPTION OF DRAWINGS

FIG. 12 is a plan view showing second protruding members of the drying device shown in FIG. 11.

DETAILED DESCRIPTION

Figure 1:
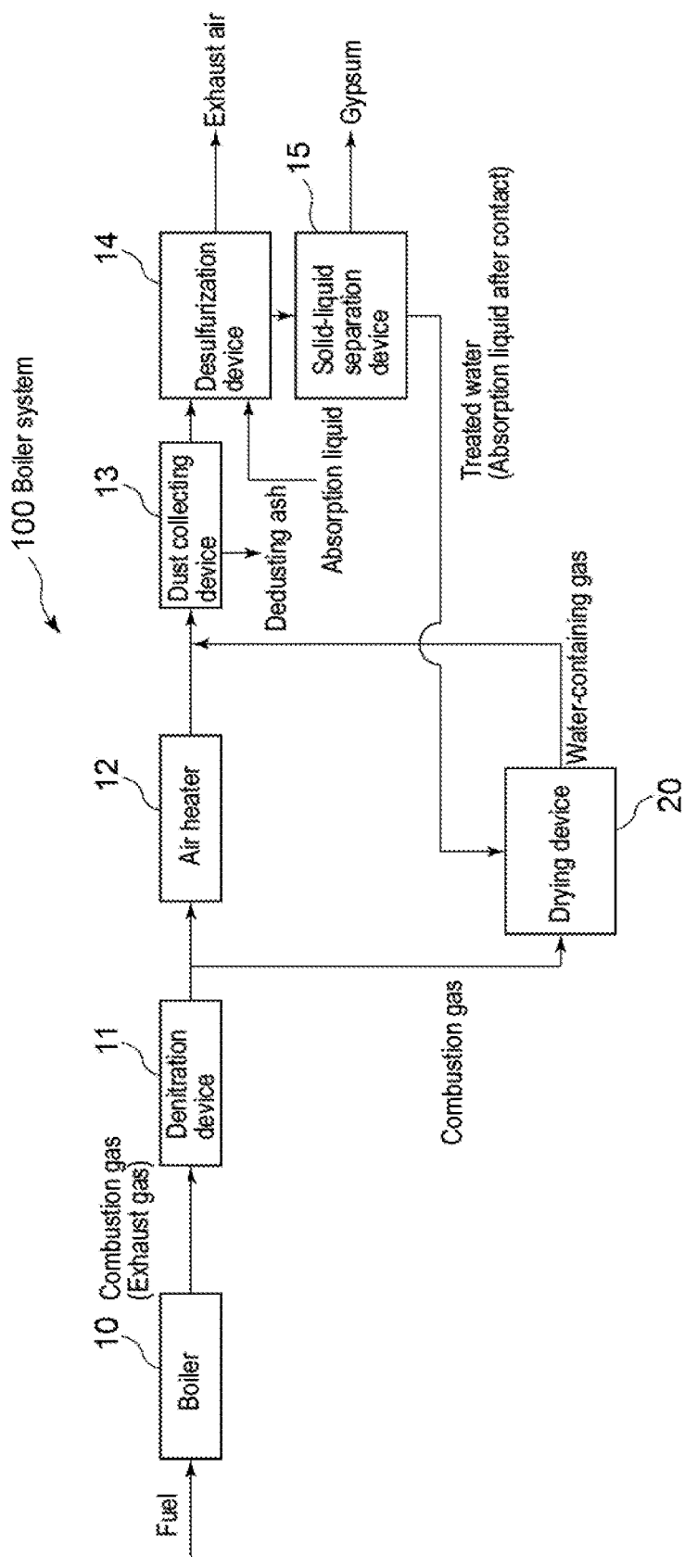
FIG. 1 is a system diagram of a boiler system according to the first embodiment of the present invention.

Some embodiments of the present invention will be described below with reference to the accompanying drawings. Contents described as embodiments and contents shown in the drawings below are merely examples, and can be embodied with any modification within a scope that does not depart from the present invention. Moreover, each embodiment can be embodied by any combination of at least two embodiments.

It is intended, however, that unless particularly identified, dimensions, materials, shapes, relative positions and the like of constituent components described as the embodiments or shown in the drawings shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

FIG. 1 is a system diagram of a boiler system 100 according to an embodiment of the present invention. The boiler system 100 is installed in a thermal power plant or the like (not shown), and includes a boiler 10. In the boiler system 100, sulfur oxides contained in a combustion gas (exhaust gas) from the boiler 10 are removed by a wet desulfurization device 14 (to be described later). Then, an absorption liquid used by the desulfurization device 14 is vaporized by a drying device 20 (to be described later) without being discharged to the outside, and circulates in the boiler system 100.

The boiler system 100 includes the boiler 10, a denitration device 11, an air heater 12, a dust collecting device 13, the desulfurization device 14, a solid-liquid separation device 15, and the drying device 20. Of the above-described devices, the boiler 10, the denitration device 11, the air heater 12, the dust collecting device 13, the desulfurization device 14, and the drying device 20 are connected by a duct (not shown). Hereinafter, the boiler system 100 will be described with a focus on the gas flow in the boiler system 100, while describing the respective devices.

In the boiler 10 where fuel is supplied, steam is generated by combusting various types of fuels (may be one type or at least two types), such as fossil fuel (coal, heavy oil, or the like), biomass fuel (alcohol, or the like), and solid fuel (wood, charcoal, or the like). Then, a steam turbine (not shown) is driven by the steam generated in the boiler 10. At this time, the fuel is combusted by using combustion air supplied from the air heater to be described later. Then, driving the steam turbine, a generator (not shown) connected to the steam turbine is driven to generate power.

Combusting the fuel in the boiler 10, a combustion gas (exhaust gas) containing nitrogen oxides and sulfur oxides is generated. Then, the combustion gas is supplied to the denitration device 11 to be denitrated in the denitration device 11. Consequently, nitrogen oxides in the combustion gas are removed. After nitrogen oxides are removed, the combustion gas is supplied to each of the air heater 12 and the drying device 20.

The air heater 12 is constituted by, for example, a heat exchanger, and heats the combustion air supplied to the boiler 10 by heat of the combustion gas. Thus, the combustion air having an increased temperature is supplied to the boiler 10.

The combustion gas dissipating heat in the air heater 12 is supplied to the dust collecting device 13. Then, dust is collected by the dust collecting device 13. Dedusting ash generated by dust collection undergoes discharge processing. On the other hand, the combustion gas after dust collection is supplied to the desulfurization device 14 to remove, that is, desulfurize sulfur oxides.

The desulfurization device 14 is provided to desulfurize the combustion gas discharged from the boiler 10 by bringing the combustion gas into contact with the absorption liquid. The desulfurization device 14 is a wet desulfurization device in the boiler system 100. As the absorption liquid, for example, limewater (calcium carbonate aqueous slurry) can be used. Desulfurizing the combustion gas by the desulfurization device 14, sulfur oxides in the combustion gas are removed. Then, the combustion gas after sulfur oxides are removed is discharged to the outside. The combustion gas may include a gas other than the so-called exhaust gas discharged from the boiler 10.

On the other hand, sulfur oxides contained in the combustion gas are removed as solids, by contacting the absorption liquid. More specifically, in a case in which, for example, the above-described limewater is used as the absorption liquid, sulfur oxides are precipitated as calcium sulfate. Thus, the absorption liquid containing calcium sulfate undergoes solid-liquid separation by the solid-liquid separation device 15. By the solid-liquid separation, gypsum (calcium sulfate) is recovered as solids. The recovered gypsum is shipped as an industrial product, for example.

Moreover, a filtrate after gypsum is separated and recovered can contain chloride ions, heavy-metal ions, and the like, as described above. Thus, in the boiler system 100, the filtrate generated by the solid-liquid separation device 15 circulates in the boiler system 100 without being discharged to the outside. More specifically, the filtrate is dried by the drying device 20. The filtrate generated by the solid-liquid separation device 15 is the absorption liquid that has contacted the combustion gas in the desulfurization device 14 described above (that is, contact absorption liquid). Thus, the contact absorption liquid will be referred to as treated water, hereinafter. The treated water may include water other than the contact absorption liquid, or may be another type of water.

In the drying device 20, the treated water is vaporized (evaporated) by heat of the combustion gas supplied from the denitration device 11 described above. This point will be described with reference to FIG. 2.

Figure 2:
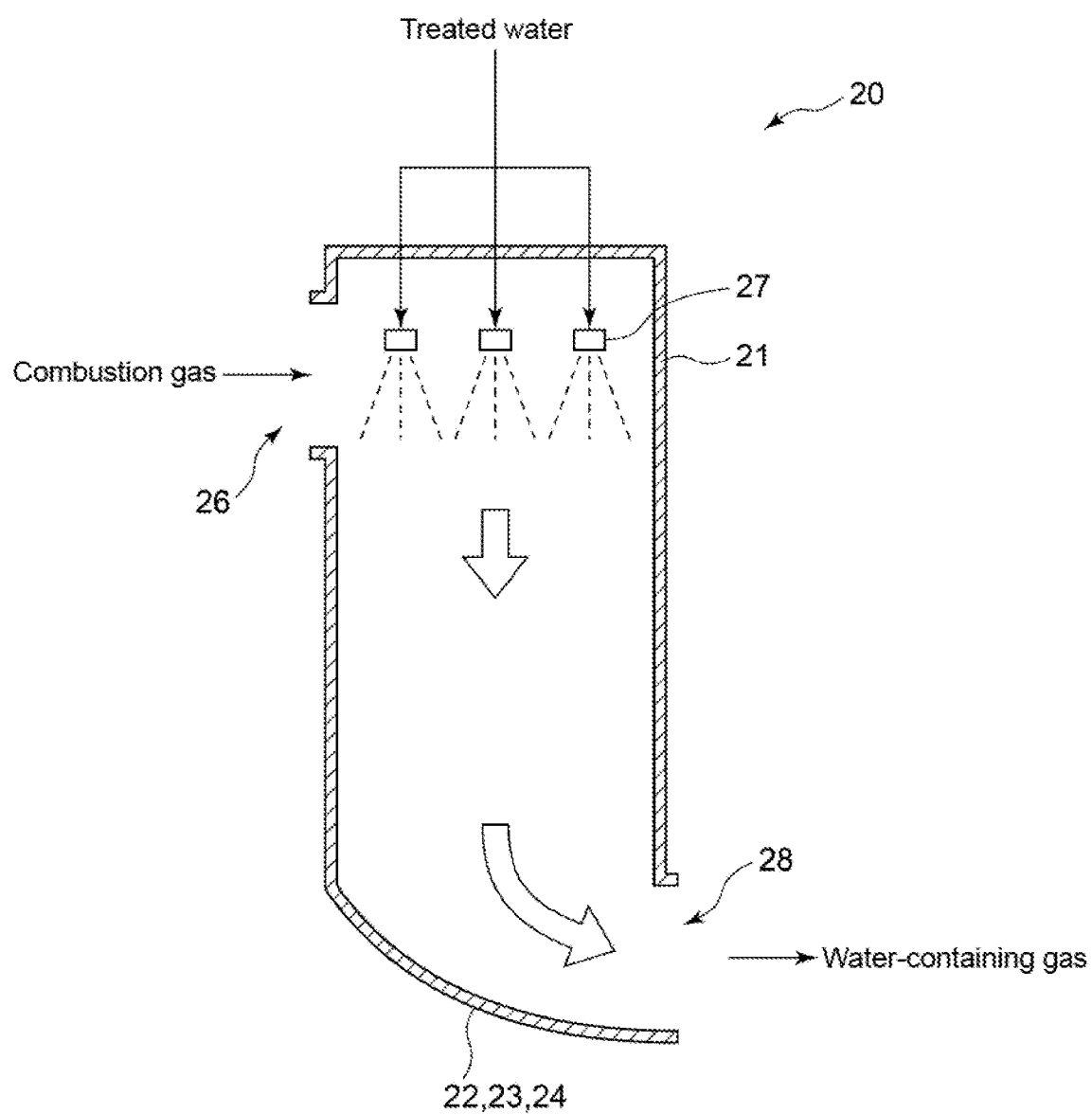
FIG. 2 is a view of a drying device according to the first embodiment of the present invention.

FIG. 2 is a view of the drying device 20 according to the first embodiment of the present invention. The drying device 20 is provided to vaporize the treated water by the heat of the combustion gas. The drying device 20 includes a housing 21, a combustion gas supply port 26, treated water supply portions 27, and an exhaust port 28. Of the above-described constituent components, the combustion gas supply port 26 is provided to supply the combustion gas to the housing 21. Moreover, the treated water supply portions 27 are provided to supply the treated water into the housing 21 in order to vaporize the treated water by the contact with the combustion gas supplied to the housing 21. Each of the treated water supply portions 27 is, for example, a nozzle. Furthermore, the exhaust port 28 is provided to discharge a water-containing gas including the treated water that has been supplied to the housing 21 and vaporized to the outside of the housing 21.

Inside the drying device 20, for example, the treated water supply portions 27, each of which is constituted by the nozzle, spray the treated water. The treated water is sprayed downward from above. Then, the combustion gas is supplied from the combustion gas supply port 26, and then moves downward from above, as indicated by a hollow arrow in FIG. 2, inside the drying device 20, so as to pass (flow) in the same direction as the spray direction of the treated water. Then, the combustion gas of a high temperature (for example, about 100° C. to 200° C.) contacts the treated water while moving downward, thereby vaporizing (evaporating) the sprayed treated water. The combustion gas that has reached a bottom 22 is discharged to the outside of the drying device 20 from the exhaust port 28 as the water-containing gas, with the vaporized treated water, as indicated by another hollow arrow in FIG. 2.

The exhaust port 28 of the drying device 20 is disposed at the lowermost part of the housing 21 and is formed to open in a direction crossing the vertical direction. More specifically, for example, as shown in FIG. 2, the exhaust port 28 is formed to open in the horizontal direction, which is a direction crossing the vertical direction with the angle of 90°. However, any specific crossing angle is possible, as long as the exhaust port 28 opens in the direction crossing the vertical direction, for example, the exhaust port 28 is formed on the side surface of the housing 21.

Moreover, the bottom 22 of the housing 21 is formed to at least partially include an inclined portion 23 formed toward the exhaust port 28. That is, the bottom 22 includes the inclined portion 23 toward the exhaust port 28 formed in a vertically lower part. In other words, the bottom 22 is formed to include the inclined portion 23, a height of which with reference to a vertical position of a lower end 24a to be described later gradually decreases toward the exhaust port 28. Moreover, the inclined portion 23 is formed as a curved surface portion 24 of a shape which is convex downward. Then, the bottom 22 of the housing 21 is formed at a position not lower than the lower end of the exhaust port 28. In FIG. 2, the entire region of the bottom 22 is formed by the inclined portion 23. However, the inclined portion 23 and a horizontal portion (not shown) may coexist, for example, in FIG. 2, the left half of the bottom 22 extends in the horizontal direction and the right half of the bottom 22 is formed toward the exhaust port 28.

Since the bottom 22 at least partially includes the inclined portion 23, it is possible to make the solids included in the combustion gas be less accumulated at the bottom 22 of the housing 21. That is, the inclined portion 23 forms a gas flow directed to the exhaust port 28, making the combustion gas and the water-containing gas flow along the gas flow. As a result, the solids are less accumulated at the bottom 22 (inclined portion 23). Moreover, even if the solids adhere to the bottom 22, it is possible to easily blow away the solids to the exhaust port 28 by a wind pressure, thanks to the gas flow formed to be directed to the exhaust port 28 along the surface of the bottom 22.

Moreover, since the exhaust port 28 is formed to open in the direction crossing the vertical direction (for example, on the side surface of the housing 21), it is possible to suppress the height of the drying device 20. Thus, a water head difference is small when the treated water is fed upward to be sprayed by the treated water supply portions 27, making it possible to downsize a pump for feeding liquid and to reduce operation power. In addition, since the height of the drying device 20 is suppressed, the drying device 20 is installed easily, making it possible to reduce an installation cost.

Furthermore, in a case in which an exhaust duct (not shown in FIG. 2) connected to the exhaust port 28 is connected to the side surface of the housing 21, for example, an administrator can easily approach the bottom 22 of the drying device 20 from outside at the time of maintenance. Accordingly, it is possible to improve maintainability of the drying device 20.

Figure 3:
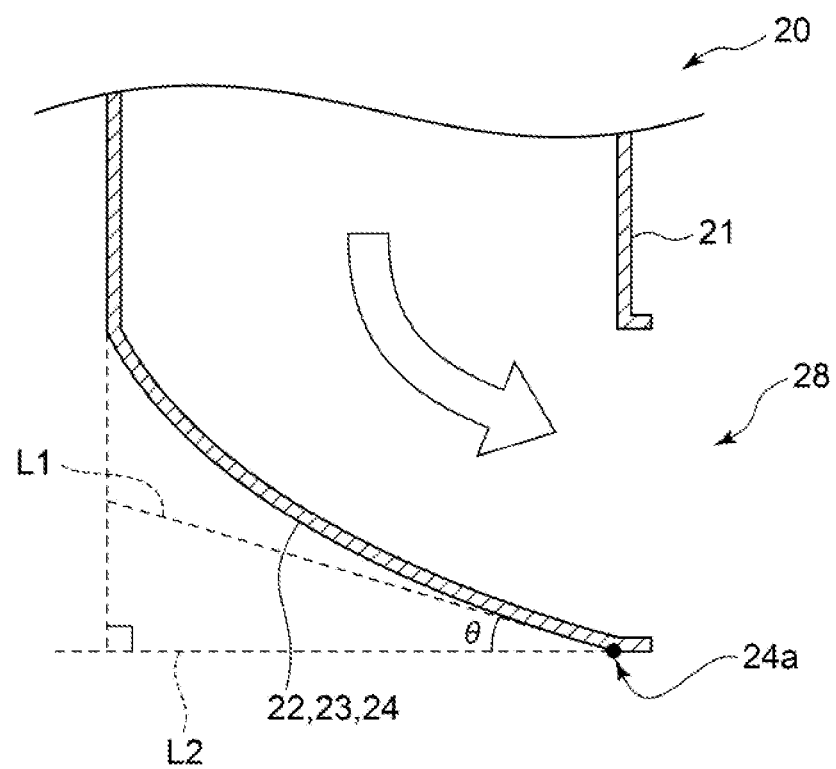
FIG. 3 is an enlarged view showing a bottom of the drying device shown in FIG. 2.

FIG. 3 is an enlarged view showing the bottom 22 of the drying device 20 shown in FIG. 2. The bottom 22 is formed to include the inclined portion 23 toward the exhaust port 28, as described above. An angle θ of the inclined portion 23 with respect to the horizontal direction can be, for example, not less than a repose angle of the solids included in the combustion gas. Thus, it is possible to easily suppress the accumulation of the solids at the bottom 22.

If the inclined portion 23 is formed by the curved surface portion 24 as shown in FIG. 3, the angle θ of the inclined portion 23 with respect to the horizontal direction changes in accordance with a right-left direction in the drawing of the curved surface portion 24. For example, the angle θ increases as a distance from the exhaust port 28 is large, and the angle θ decreases as a distance to the exhaust port 28 is small. Thus, in the curved surface portion 24, the angle θ with respect to the horizontal direction is preferably not less than the repose angle, at any position, that is, in the entire region in the right-left direction of the drawing. More specifically, if the entire region of the inclined portion 23 is formed by the curved surface portion 24 as shown in FIG. 3, the angle θ, which is formed by a tangent line L1 passing through the lower end 24a of the curved surface portion 24 and a horizontal line L2, is preferably not less than the repose angle. Thus, it is possible to sufficiently suppress the volume of the solids in the curved surface portion 24.

FIG. 3 shows the tangent line L1 to the outer surface of the housing 21. However, the thickness of the housing 21 is uniform in the curved surface portion 24. Thus, the angle θ between the horizontal line L2 and the tangent line L1 to the outer surface matches the angle θ between the horizontal line L2 and a tangent line (not shown) to an inner surface (a surface on a side in contact with the solids). Moreover, if the inclined portion 23 is formed to include the curved surface portion and a planar portion, for example, the angle θ can be decided with reference to a tangent line passing through a boundary portion between the curved surface portion and the planar portion.

The repose angle can be decided by a method defined in JISR9301-2-2, for example. Moreover, the type of solids (physical property such as a size or a shape) can generally be decided by the type of fuel combusted in the boiler 10. Therefore, the repose angle can be decided in accordance with the decided type of solids, and the degree (angle θ) of inclination of the bottom 22 can be formed to be the decided repose angle.

Moreover, it is desirable that the angle θ of the inclined portion 23 with respect to the horizontal direction is, more specifically, for example, not less than 30°, preferably not less than 35°. In addition, it is desirable that the upper limit of the angle θ is, for example, less than 90°, preferably not greater than 60°. Setting the angle θ in this range, it is possible to generally set the angle θ of the inclined portion 23 with respect to the horizontal direction not less than the repose angle of the solids, and to easily suppress the accumulation of the solids.

Referring back to FIG. 1, the water-containing gas discharged from the drying device 20 is supplied to the dust collecting device 13 through an exhaust duct (gas duct) which is not shown in FIG. 1. Then, the dust collecting device 13 removes dust and the like in the water-containing gas, with the above-described combustion gas. Subsequently, the water-containing gas is discharged to the outside via the desulfurization device 14 and the like, with the above-described combustion gas.

According to the boiler system 100 described above, it is possible to vaporize the absorption liquid (the above-described wastewater) that has contacted the exhaust gas in the desulfurization device 14, as the treated water, in the drying device 20. Thus, it is possible to suppress discharge of the absorption liquid that has contacted the exhaust gas to the outside, and to reduce the cost of treating the wastewater.

Moreover, it is also possible to suppress accumulation of the solids in the exhaust gas, in the drying device 20.

Figure 4:
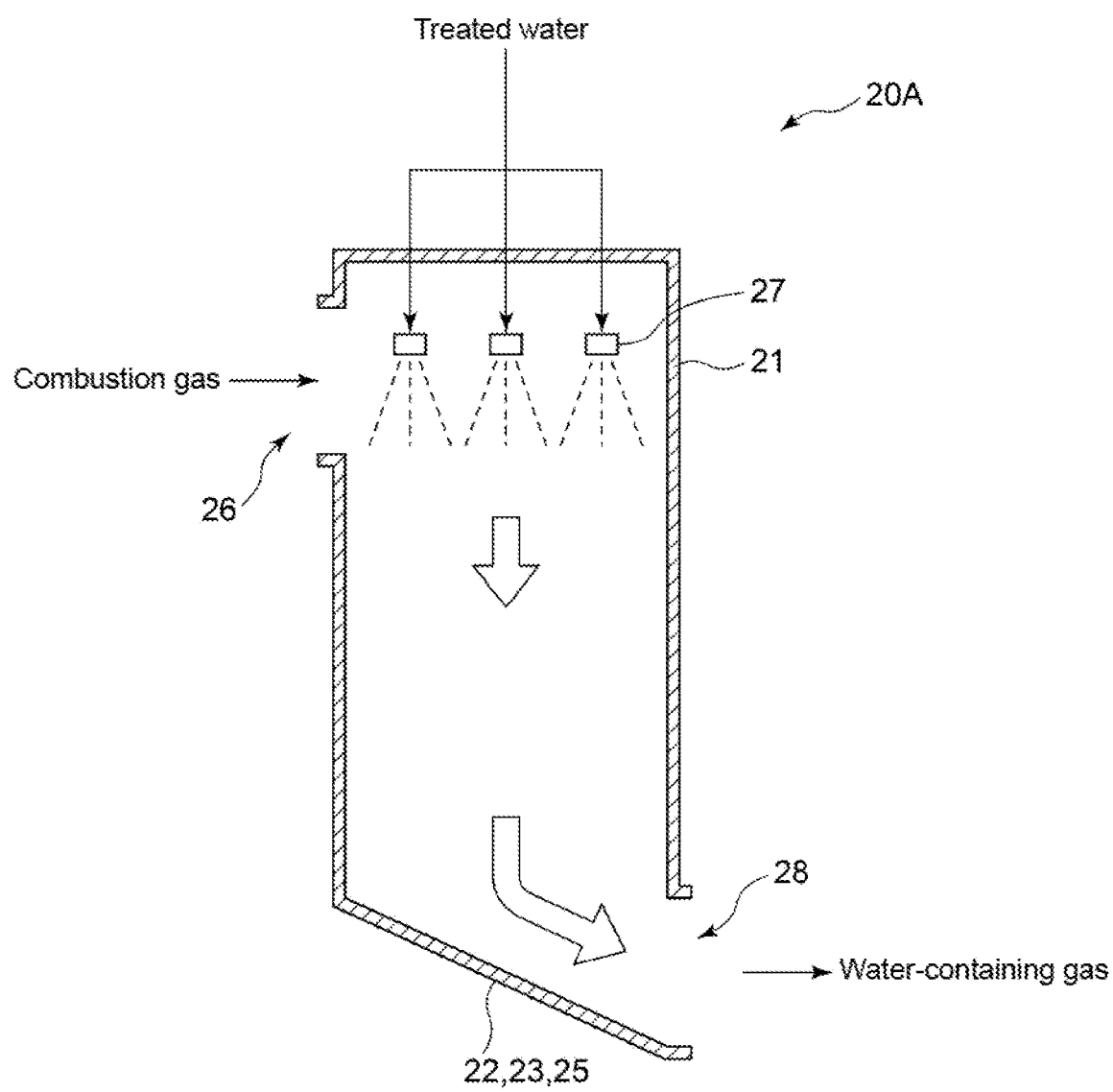
FIG. 4 is a view of a drying device according to the second embodiment of the present invention.

FIG. 4 is a view of a drying device 20A according to the second embodiment of the present invention. The same members as those in the drying device 20 described above with reference to FIG. 2 are indicated by the same reference numerals and not described again in detail. The bottom 22 of the drying device 20 shown in FIG. 2 above is formed to include the curved surface portion 24. However, in the drying device 20A shown in FIG. 4, the bottom 22 is formed to include a planar portion 25 formed toward the exhaust port 28. In FIG. 4, the entire region of the bottom 22 is formed by the planar portion 25. However, only a part of the bottom 22 may be formed by the planar portion 25.

In the drying device 20A including the planar portion 25, the angle θ of the planar portion 25 with respect to the horizontal direction (not shown in FIG. 4) is the same in the entire region of the planar portion 25. Then, the angle θ of the planar portion 25 preferably satisfies the range of the angle θ described above in the curved surface portion 24.

Since the bottom 22 is formed to include the planar portion 25, it is possible to form the inclined portion 23 of the bottom 22 by the planar portion 25. Thus, it is possible to simplify the work of forming the bottom 22 formed by the inclined portion 23, when manufacturing the drying device 20A.

Figure 5:
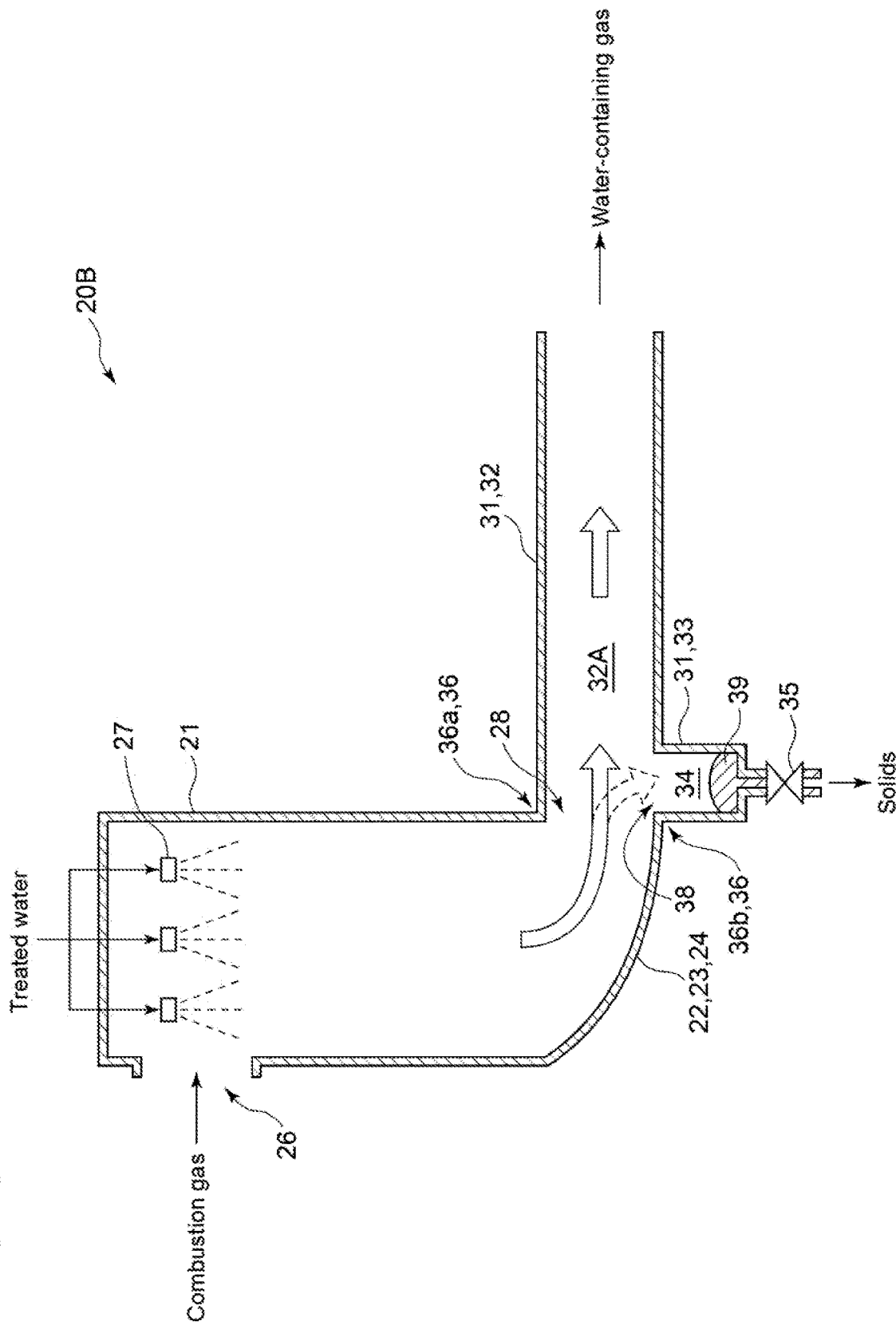
FIG. 5 is a view of a drying device according to the third embodiment of the present invention.

FIG. 5 is a view of a drying device 20B according to the third embodiment of the present invention. An exhaust duct 31 (gas duct) is connected to the exhaust port 28 of the drying device 20B. The exhaust duct 31 is connected to a gas duct between the air heater 12 and the dust collecting device 13, which are described above with reference to FIG. 1. Therefore, the water-containing gas discharged through the exhaust port 28 is supplied to the gas duct downstream of the air heater 12 through the exhaust duct 31, as indicated by hollow arrows in FIG. 5, and then supplied to the dust collecting device 13 after merging with the combustion gas supplied from the air heater 12.

The exhaust duct 31 includes an exhaust duct body portion 32 and a solid collection portion 33. Of the above-described constituent components, the exhaust duct body portion 32 gives passage to the water-containing gas discharged from the exhaust port 28. The exhaust duct body portion 32 and the solid collection portion 33 are connected by a connection portion 36. The connection portion 36 includes an upper connection portion 36a and a lower connection portion 36b.

Moreover, the solid collection portion 33 defines a collection space 34 communicating with an opening 38 formed in a lower part of the exhaust duct body portion 32. The collection space 34 is provided to collect solids 39 included in the water-containing gas passing through the exhaust duct body portion 32. The opening 38 makes the collection space 34 and an inner space 32A of the exhaust duct body portion 32 communicate with each other. The solid collection portion 33 is formed to have the opening 38, for example, on the bottom surface of the exhaust duct body portion 32, if the exhaust duct body portion 32 is formed into a rectangular shape on a cross-section of the gas flow. The solid collection portion 33, which is shown with the rectangular cross-sectional shape in FIG. 5, can have any shape such as a cylindrical shape, a box shape, a cone shape, or the like, to be more specific.

The combustion gas generated by the boiler 10 (see FIG. 1) can include solids, scales, foreign substances, and the like, in addition to the above-described nitrogen oxides and sulfur oxides. Of the above-described elements, relatively small and light solids (not shown) are discharged to the dust collecting device 13, by the air flow of the water-containing gas. However, the relatively heavy and large solids 39, such as the scales and the foreign substances, may fall into the exhaust duct 31 under their own weights, before reaching the dust collecting device 13. Then, the fallen solids 39 may be accumulated at fallen positions, respectively. In particular, the exhaust port 28 is formed to open in the direction crossing the vertical direction, as described above. Accordingly, the solids 39 easily fall due to gravity. Thus, in the drying device 20B, since the solids 39 are collected in the solid collection portion 33, suppressing accumulation of the solids 39 in an unintended portion.

The combustion gas (including the solids 39) supplied to the drying device 20B flows downward, as described above. Then, the water-containing gas generated by vaporizing the treated water transversely changes the flow thereof at the bottom 22 and is discharged from the exhaust port 28, as in indicated by the hollow arrows in FIG. 5. At this time, the relatively heavy and large solids 39 easily fall under their own weights. Thus, since the solid collection portion 33 is formed, it is possible to intentionally drop the solids 39, as indicated by a dashed arrow in FIG. 5. Accordingly, it is possible to collect the solids 39 in the solid collection portion 33 under their own weights, and to suppress the inflow of the solids 39 to the subsequent device (dust collecting device 13). Thus, it is possible to avoid an unintended operational problem such as clogging of the subsequent device with the solids.

Moreover, since the exhaust duct 31 is provided with the solid collection portion 33, it is possible to easily extract the solids 39 collected in the solid collection portion 33. That is, it is possible to extract the solids 39 from the solid collection portion 33 by opening a valve 35 disposed under the solid collection portion 33, facilitating maintenance. In place of the valve 35, a mechanism capable of opening optionally, such as a manhole, may be used. Furthermore, since the water-containing gas is discharged through the exhaust port 28 formed in the direction crossing the vertical direction, it is possible to easily cause the solids included in the water-containing gas to fall under their own weighs, and to easily collect the solids in the solid collection portion 33.

In particular, in the drying device 20B shown in FIG. 5, the solid collection portion 33 is formed such that the upstream edge of the opening 38 is positioned in the lower connection portion 36b connecting the exhaust port 28 and the exhaust duct body portion 32. Since the solid collection portion 33 is formed at this position, the flow rate is greatly decreased by the bottom 22, making it possible to collect the solids 39 at a position where the solids 39 easily fall, in particular.

Figure 6:
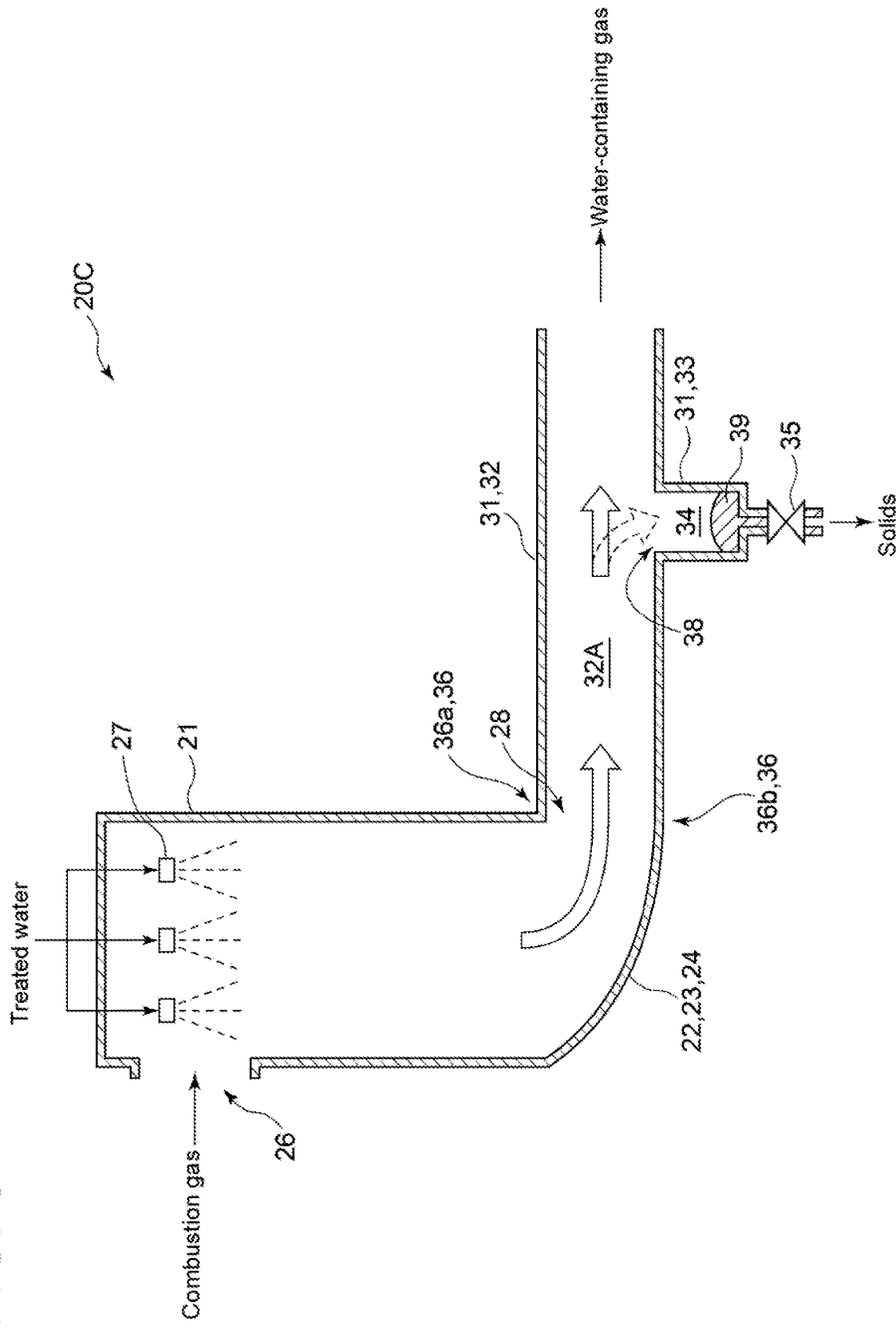
FIG. 6 is a view of a drying device according to the fourth embodiment of the present invention.

FIG. 6 is a view of a drying device 20C according to the fourth embodiment of the present invention. In the above-described drying device 20B shown in FIG. 5, the solid collection portion 33 is formed such that the upstream edge of the opening 38 is positioned in the lower connection portion 36b. However, in the drying device 20C shown in FIG. 6, the solid collection portion 33 is formed in the lower part of the exhaust duct body portion 32, at a position away from the lower connection portion 36b. More specifically, the solid collection portion 33 is formed, for example, at an intermediate position in the flow direction, in the exhaust duct body portion 32 connected to a subsequent device (not shown).

Since the solid collection device 33 is disposed at the position away from the lower connection portion 36b, it is possible to form the solid collection portion 33 at any position. Accordingly, it is possible to improve design flexibility of the drying device 20C.

Figure 7:
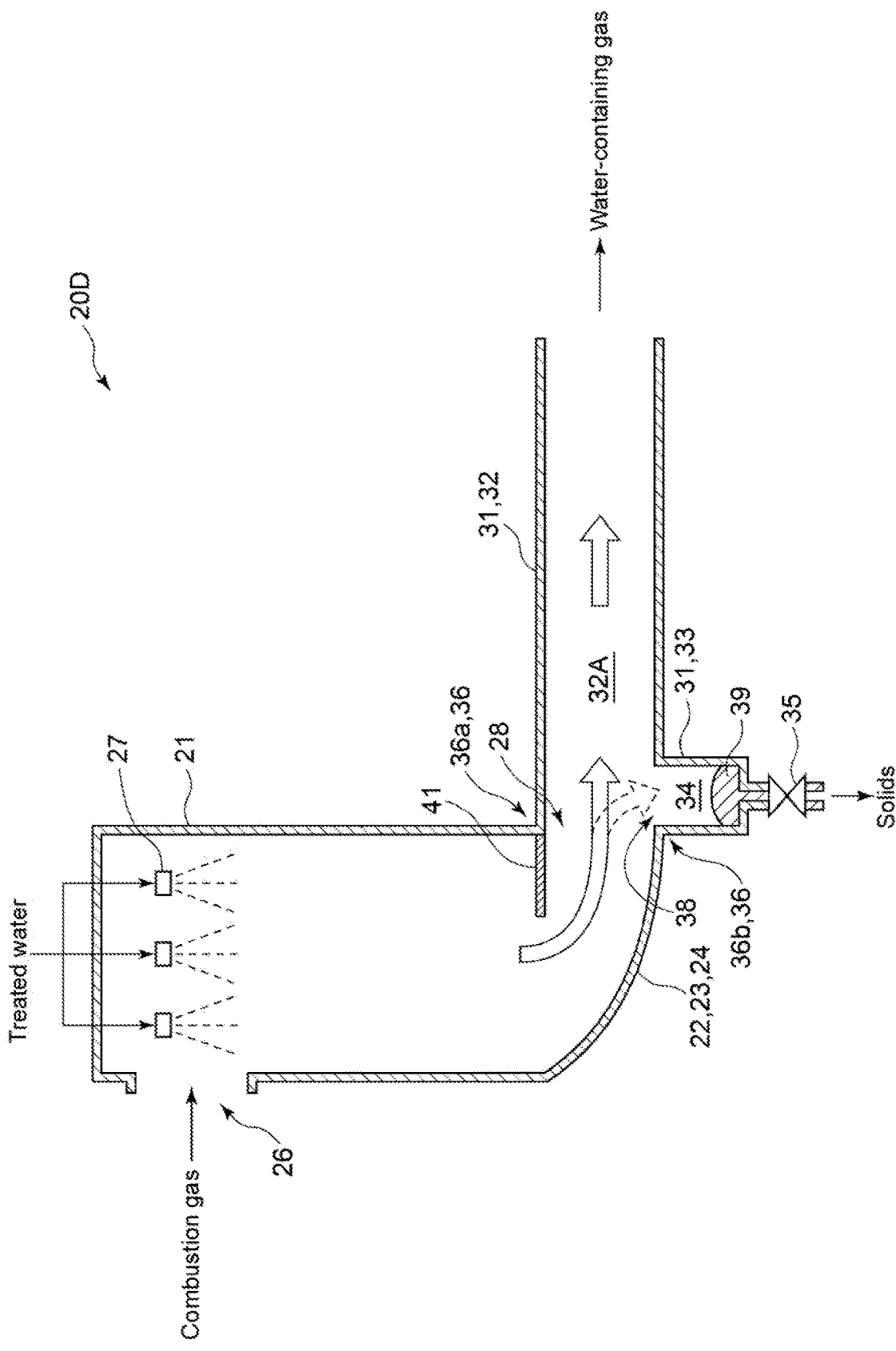
FIG. 7 is a view of a drying device according to the fifth embodiment of the present invention.

FIG. 7 is a view of a drying device 20D according to the fifth embodiment of the present invention. The drying device 20D shown in FIG. 7 is obtained by arranging a first protruding member 41 (rectifying member) for suppressing the gas flow in the vicinity of the upper connection portion 36a, in the above-described drying device 20B shown in FIG. 5. The first protruding member 41 protrudes from the upper connection portion 36a (the upper end of the exhaust port 28) into the housing 21, in the housing 21.

With the first protruding member 41, it is possible to suppress the gas flow in the vicinity of the upper connection portion 36a at a connection position between the exhaust port 28 and the exhaust duct body portion 32, and to suppress reach of the combustion gas, which flows in through the combustion gas supply port 26, to the exhaust port 28 in the shortest distance. Thus, it is possible to suppress the passage of the solids 39 above the exhaust port 28 through the solid collection portion 33. As a result, it is possible to more reliably collect the solids 39 in the solid collection portion 33 formed in the in a lower part of lower part of the exhaust duct body portion 32.

Figure 8:
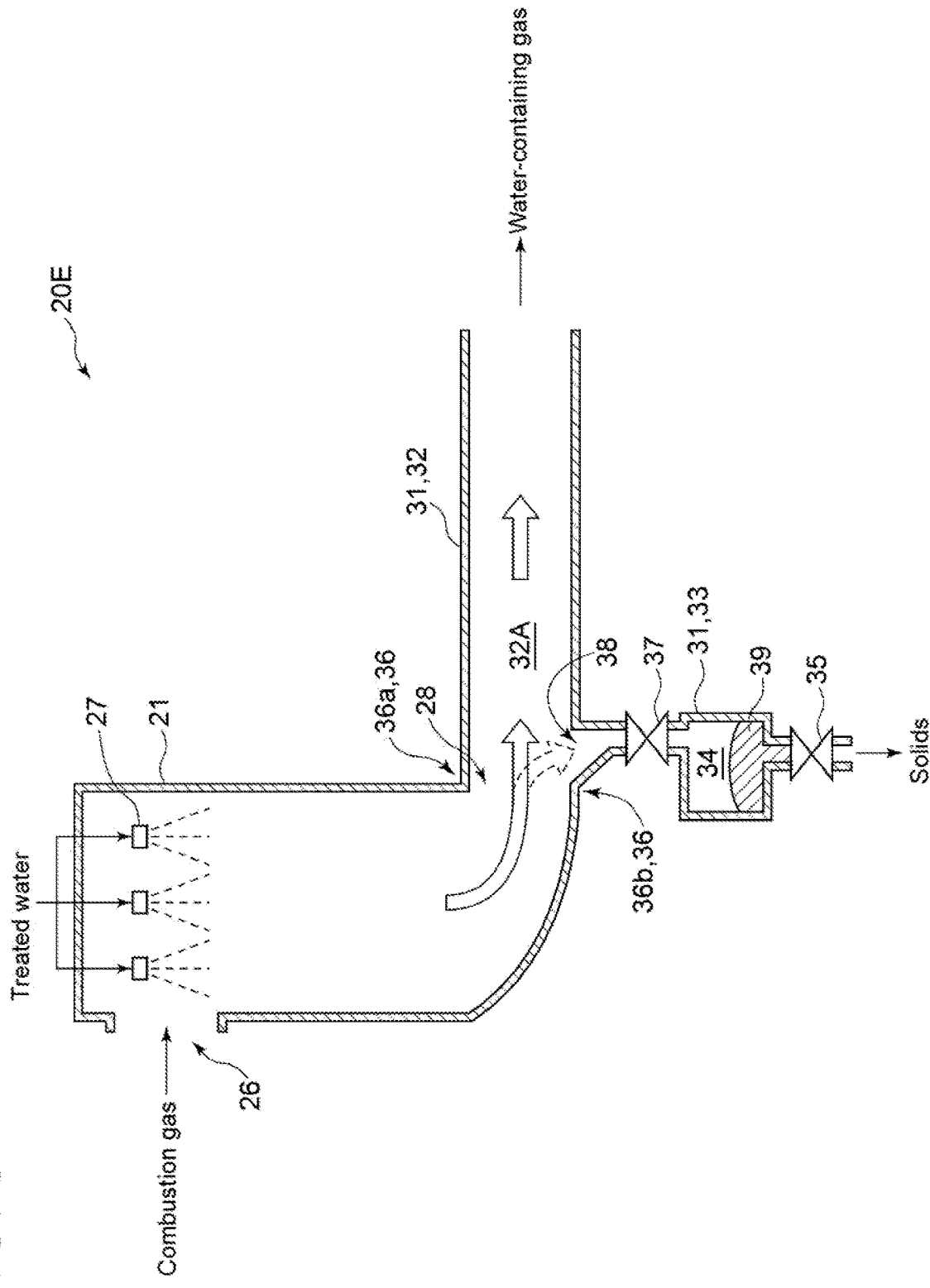
FIG. 8 is a view of a drying device according to the sixth embodiment of the present invention.

FIG. 8 is a view of a drying device 20E according to the sixth embodiment of the present invention. The drying device 20E shown in FIG. 8 includes an opening/closing member 37 for switching the presence/absence of communication between the inner space 32A of the exhaust duct body portion 32 and the collection space 34 of the solid collection portion 33, that is, switching opening/closing of the opening 38. The opening/closing member 37 is formed in the lower part of the exhaust duct body portion 32. The opening/closing member 37 is constituted by, for example, a valve. However, it is possible to adopt a mechanism capable of opening/closing optionally, such as a damper. The opening 38 formed in the exhaust duct body portion 32 may form an inclination to gradually narrow downward as shown in FIG. 8, in order to easily collect the solids 39. However, the opening 38 may not form such an inclination.

With the opening/closing member 37 for switching the opening/closing of the opening 38, it is possible to extract the solids 39 collected in the solid collection portion 33, with the opening 38 being closed. Thus, it is possible to suppress scattering of the solids to the exhaust port 28 and the exhaust duct body portion 32 (may be one of them), when the solids are extracted from the solid collection portion 33.

Figure 9:
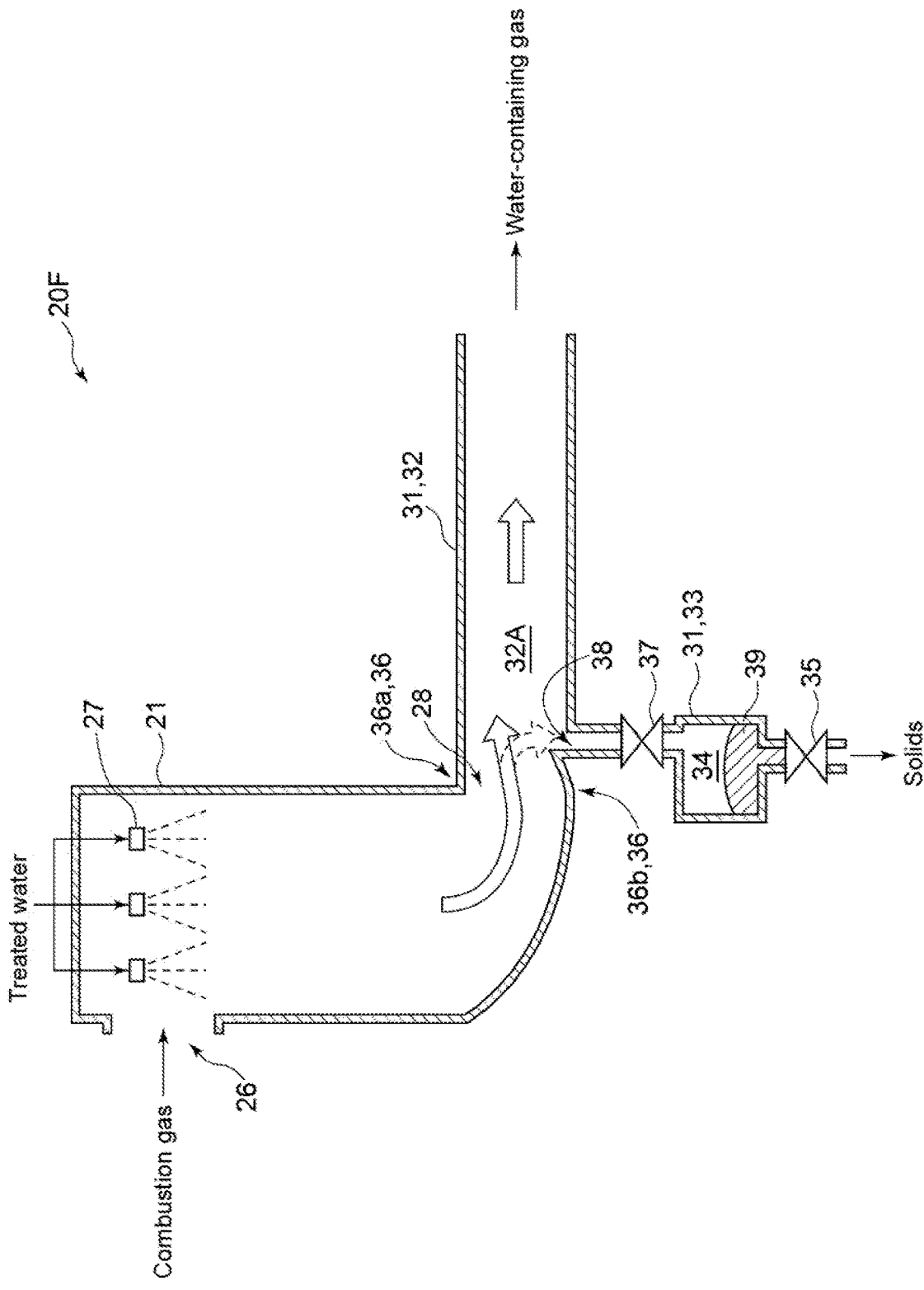
FIG. 9 is a view of a drying device according to the seventh embodiment of the present invention.

FIG. 9 is a view of a drying device 20F according to the seventh embodiment of the present invention. In the drying device 20F shown in FIG. 9, the opening 38 formed in the exhaust duct body portion 32 forms an inclination rising along the flow direction of the water-containing gas. That is, the inclination is formed such that a height with reference to the vertical position of the lower connection portion 36b gradually increases from the connection portion 36 toward the opening 38. The length of the inclined portion can be, for example, not less than 0.1 m and not greater than 5 m, although the length, which changes depending on the length of the exhaust duct body portion 32, cannot unconditionally be decided. Moreover, the degree of the inclination can be, for example, not less than 1° and less than 90° as the angle with respect to the horizontal direction, although the degree of the inclination, which changes depending on the height of the exhaust duct body portion 32, cannot unconditionally be decided. In particular, the angle with respect to the horizontal direction is preferably not greater than the repose angle of the solids 39.

Since the opening 38 includes such an inclination rising along the flow direction of the water-containing gas, small and light solids (not shown), which need not be collected, are directed upward as indicated by an hollow arrow in FIG. 9. Thus, it is possible to avoid collecting the small and light solids in the solid collection portion 33. On the other hand, the heavy and large solids 39 to be collected fall under their own weights after passing through the rising inclination, making it possible to easily collect the solids 39 in the solid collection portion 33. As a result, it is possible to selectively collect the large and heavy solids 39 in the solid collection portion 33, and to reduce the discharge amount of the solids 39. Furthermore, it is also possible to reduce a discharge frequency of the solids 39.

Figure 10:
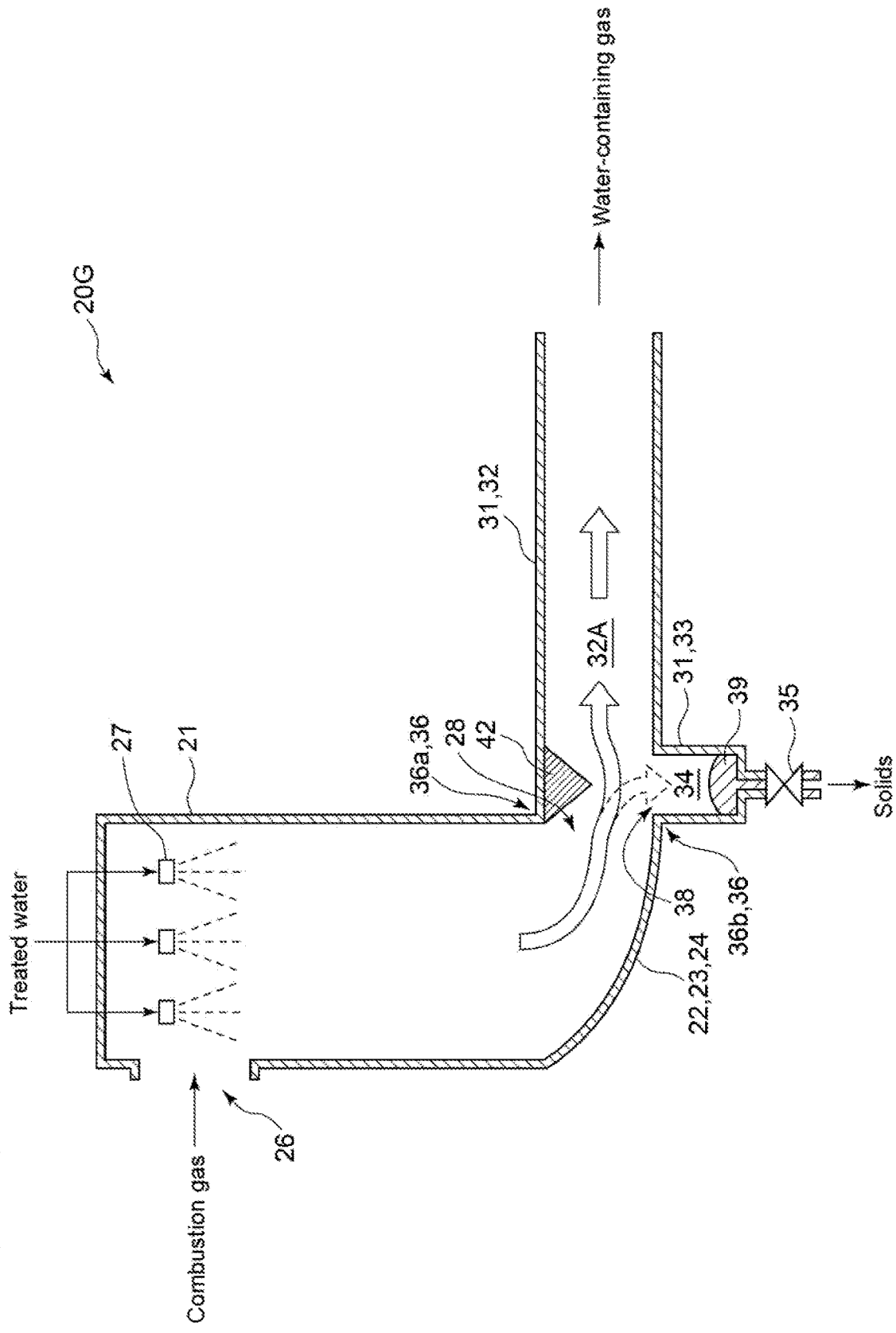
FIG. 10 is a view of a drying device according to the eighth embodiment of the present invention.

FIG. 10 is a view of a drying device 20G according to the eighth embodiment of the present invention. The drying device 20G shown in FIG. 10 includes, in the exhaust duct body portion 32, a second protruding member 42 protruding from an upper inner surface of the solid collection portion 33 toward the opening 38, above the solid collection portion 33. The second protruding member 42 has a triangle shape narrowing downward, as viewed from a cross-section.

With the second protruding member 42 having such a shape, it is possible change the flow direction of the water-containing gas to downward. Thus, it is possible to promote falling of the solids 39, which are included in the water-containing gas and easily fall under their own weights. As a result, it is possible to easily collect the solids 39 in the solid collection portion 33.

Figure 11:
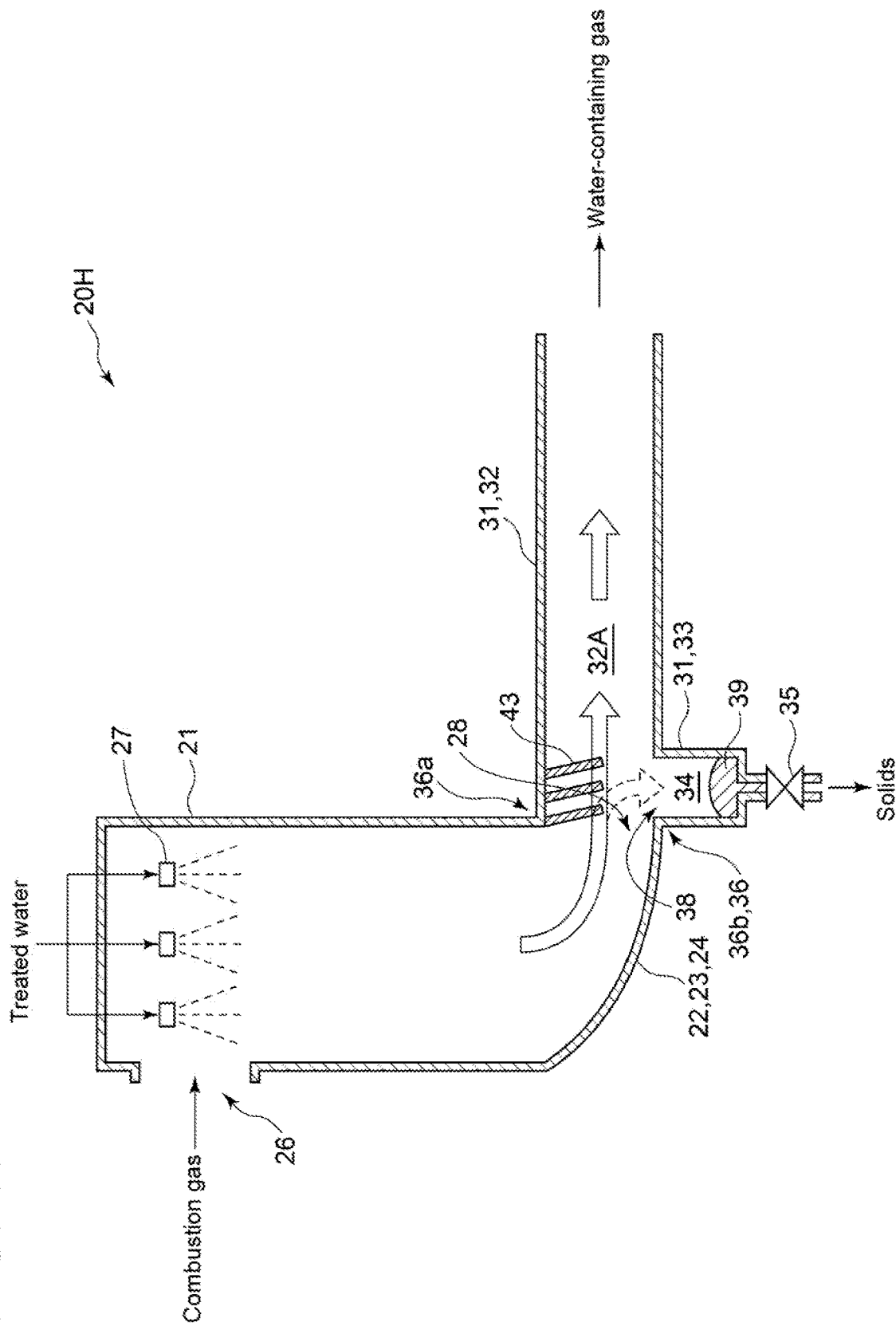
FIG. 11 is a view of a drying device according to the ninth embodiment of the present invention.

FIG. 11 is a view of a drying device 20H according to the ninth embodiment of the present invention. Similarly to the above-described drying device 20G, the drying device 20H shown in FIG. 11 also includes second protruding members 43 protruding from the upper inner surface of the solid collection portion 33 toward the opening 38. However, unlike the structure of the above-described second protruding member 42, each of the second protruding members 43 has an inclined surface inclined along the flow direction from the upper inner surface of the exhaust duct body portion 32 and directed to the opening 38.

FIG. 12 is a plan view showing the second protruding members 43 of the drying device 20H shown in FIG. 11. FIG. 12 shows the visualized interior of the exhaust duct body portion 32, from the above of the exhaust duct body portion 32. In the inner space 32A of the exhaust duct body portion 32, the water-containing gas flows in the direction of a hollow arrow shown in FIG. 12.

Above the inner surface of the exhaust duct body portion 32, an upper end surface 43a of the second protruding member 43 is joined. Then, the second protruding member 43 extends downward while being inclined along the flow direction of the water-containing gas. The lower end surface 43b of the second protruding member 43 is arranged above the opening 38 (that is, above the solid collection portion 33). Moreover, the second protruding member 43 includes a bend portion 43c bending along the flow direction, in a top view.

Moreover, one or a plurality of second protruding members 43 are arranged. For example, in FIG. 12, the five second protruding members 43 are arranged in the top view. If the five second protruding members 43 are arranged, it is preferable to arrange two second protruding members on the most upstream side, one second protruding member on the downstream side of the aforementioned two, and additional two second protruding members on the downstream side of the aforementioned one, in the flow direction. Of the five second protruding members 43, it is preferable to arrange the four second protruding members 43 at the four corners, respectively, of a square which is centered at the second protruding member 43 arranged at the center. A method of arranging the second protruding members 43 is not limited to a staggered arrangement of FIG. 12, but can be selected from any of, for example, a lattice arrangement, and an arrangement with one vertical row and one perpendicular row with respect to the flow of the water-containing gas.

With the second protruding members 43, it is possible cause the water-containing gas to collide with the second protruding members 43. Then, due to the collision of the water-containing gas, the solids 39 (see FIG. 11) included in the water-containing gas are gathered in the bend portion 43c along the surface of the second protruding member 43. The gathered solids 39 move downward along the bend portion 43c by the wind pressure of the water-containing gas, and fall into the solid collection portion 33 via the lower end surface 43b and the opening 38. Then, with a series of these processes, it is possible to easily collect the solids 39 in the solid collection portion 33.

The invention claimed is:

1. A boiler system comprising:
   a boiler;
   a desulfurization device for desulfurizing an exhaust gas discharged from the boiler by bringing the exhaust gas into contact with an absorption liquid; and
   a treated water drying device for vaporizing treated water by heat of a combustion gas,
   wherein the treated water drying device includes:
   a housing having at least a pair of opposed, parallel, substantially vertical sidewalls, one of the pair of substantially vertical sidewalls defining a side surface of the housing;
   a combustion gas supply port in an upper portion of the housing for supplying the combustion gas to the housing;
   a treated water supply portion in the upper portion of the housing for supplying the treated water into the housing;
   an exhaust port for discharging a water-containing gas including the treated water that has been supplied to the housing and vaporized to an outside of the housing,
   the exhaust port is formed on the side surface of the housing and opening in a direction crossing a vertical direction,
   the housing has a bottom connected to a bottom surface of the exhaust port and the housing bottom including an inclined portion and being formed as a solid, continuous, closed concave member extending from the other of the pair of vertical sidewalls, from a vertical position substantially above the bottom surface of the exhaust port along a smoothly curved concave path to the point that the housing bottom is connected to the bottom surface of the exhaust port,
   wherein the combustion gas includes the exhaust gas discharged from the boiler, and
   wherein the treated water includes the absorption liquid that has contacted the exhaust gas and discharged from the desulfurization device.

2. The boiler system according to claim 1, wherein the inclined portion is formed at an angle, which is formed by a tangent line L1 passing through the point that the housing bottom is connected to the bottom surface of the exhaust port and a horizontal line L2, is not less than a repose angle of solids included in the combustion gas.

3. The boiler system according to claim 1, wherein the inclined portion is formed at an angle, which is formed by a tangent line L1 passing through the point that the housing bottom is connected to the bottom surface of the exhaust port and a horizontal line L2, of not less than 30° and less than 90° with respect to a horizontal direction.

4. The boiler system according to claim 1, comprising an exhaust duct connected to the exhaust port,
   wherein the exhaust duct includes:
   an exhaust duct body portion giving passage to the water-containing gas discharged from the exhaust port; and
   a solid collection portion defining a collection space communicating with an opening formed in a lower part of the exhaust duct body portion, the collection space being provided to collect solids included in the water-containing gas passing through the exhaust duct body portion.

5. The boiler system according to claim 4, wherein the housing includes a first protruding member protruding from an upper end of the exhaust port into the housing.

6. The boiler system according to claim 4, wherein the solid collection portion includes an opening/closing member for opening/closing the opening.

7. The boiler system according to claim 4, wherein the exhaust duct body portion includes a second protruding member protruding from an upper inner surface of the solid collection portion toward the opening.

* * * * *